F. K. REIBIN.
AUTOMATIC VALVE.
APPLICATION FILED AUG. 30, 1919.
1,332,997.
Patented Mar. 9, 1920.
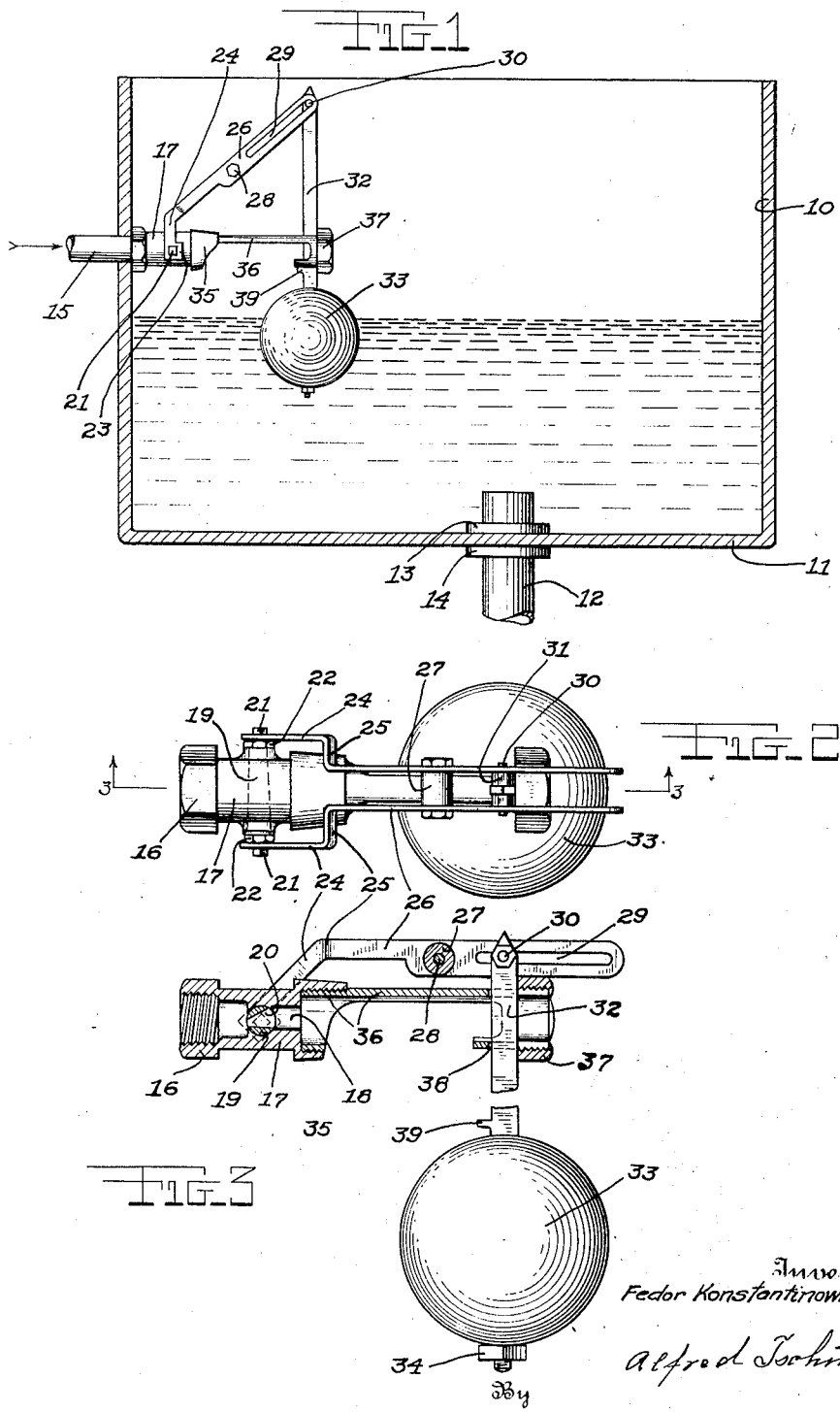
Inventor
Fedor Konstantinowich Reibin
By Alfred Tschinkel
Attorney

UNITED STATES PATENT OFFICE.

FEDOR KONSTANTINOWICH REIBIN, OF ROBSON, BRITISH COLUMBIA, CANADA, ASSIGNOR OF FORTY PER CENT. TO RUDOLPH KLIAVIN, OF SEATTLE, WASHINGTON.

AUTOMATIC VALVE.

1,332,997.      Specification of Letters Patent.      Patented Mar. 9, 1920.

Application filed August 30, 1919. Serial No. 320,942.

*To all whom it may concern:*

Be it known that I, FEDOR KONSTANTINOWICH REIBIN, a citizen of Russia, residing at Robson, Province of British Columbia, and Dominion of Canada, have invented certain new and useful Improvements in Automatic Valves, of which the following is a specification.

This invention has as its object the provision of a flushing tank the inlet of which is controlled by a valve arranged therewithin and arranged to operate in a novel manner.

A further object is to provide a tank valve of the class described comprised of few and simple parts and which are efficient and satisfactory in their use.

These objects are attained by the novel construction and combination of parts hereinafter described and shown in the accompanying drawings, forming a material part of this disclosure, and in which—

Figure 1 is a vertical sectional view taken through a conventional type of flushing tank and indicating the application of the invention.

Fig. 2 is an enlarged top plan view showing the valve in detail, and

Fig. 3 is a longitudinal sectional view taken on line 3—3 of Fig. 2.

Referring to the drawings in detail, the numeral 10 indicates a conventional type of tank, here shown to be rectangular, having an open top. In the bottom 11 is secured a discharge pipe 12, the same being held by flanges 13 and 14, respectively inner and outer, in such manner as to form a water-tight joint, the pipe being open at its inner end, which extends slightly into the tank.

An inlet pipe 15 enters the tank at a point sufficiently high to preserve a quantity of water within the tank for flushing purposes. This pipe is directly connected with the head 16 of a valve body 17, containing a through opening 18 while set transversely within the body 17 is a rotary valve 19, having a transverse passage 20, alinable with the passage 18 when the valve is rotated into operative position.

Formed with the ends of the rotary valve 19 are squared extending ends 21 held in position by nuts 22, and engaged with the squared ends 21 are openings 23 formed in the lower ends of arms 24, bent inwardly, as at 25, and then continuing straight and parallel as at 26, these arms being held in rigid spaced relation by a spacer 27, through which passes a securing bolt 28. Said arms constitute levers for operating the valve.

Beyond the spacer 27, the arms have elongated slots 29, into which extend pins 30, formed with a block-like element 31, from the center of which extends pendantly downward an arm 32, secured at its lower end to the float 33 here shown in the form of a sphere, the float being secured by a nut 34 at the bottom of the arm 32.

Engaged in the inner end of the body 17 is a tube 36, partially cut away so as to permit the water to flow directly downward into the tank, the tube having upon its outer end a nut 37, which acts as a guide for the rear edge of the bar or arm 32, which passes through openings 38, formed in the tube adjacent to the nut and which act as side guides for the arm as it is raised or lowered by the inlet or educt of water from the tank. In order to prevent the valve rising to an undesirable extent, a detent 39 is formed with the arm 32 the same being adapted to make contact with the lower side of the tube 36, when the arm is raised to its limit, at which time the valve 19 will be turned so as to close the passage through the head 17.

In operation, when the tank is empty, obviously the float, due to its gravity combined with the attached parts extends to the lower part of the tank, the arms 26 rotating the valve 19 to open the passage allowing the water to pass through into the tank, gradually rising until the float 33 has reached its uppermost position so that the detent 39 is against the lower part of the tube, at which time the arms 26 will be disposed angularly and the valve rotated so as to be in a closed position, allowing the water to fill the tank to a desired level, when, due to the pivot pin 30 being movably and slidably engaged in the slots 29, the valve is closed in a relatively slow manner, avoiding noise or objectionable sounds of the rushing water, or water hammer in the inlet pipe 15.

Having thus described my invention what I claim as new and desire to secure by Letters Patent, is—

1. In an automatic valve, the combination with a tank adapted to hold water, an outlet therefrom, and an inlet thereto, of a hollow body engaged in said tank with said inlet, said body having a central passage formed therethrough, a rotary valve engaged transversely in said body, a pair of arms engaging at opposite ends with said valve, said arms containing elongated slots at their outer ends, a float movable in said tank, and an arm engaged with said float having a pin operably engaged in said slots.

2. In an automatic valve, the combination with a tank, a source of supply leading thereto and an outlet therefrom, of a body engaged at one end with said source of supply inside of said tank, said body having a through passage, a tubular extension in the opposite end of said body, a rotary valve arranged transversely in the passage of said body, said valve having extending ends, a pair of levers engaged with said ends, said levers extending angularly outward and having elongated slots in their outer ends, a float adapted to be raised or lowered by the water in said tank, an arm engaged therewith, said arm being guided by said extension, and pivotal connections in the upper end of said arm engaging in the mentioned slots of said levers whereby they are caused to rotate said valve upon the movement of said float.

3. In an automatic valve, the combination with a tank, a body in said tank having a through passage formed therein, a tubular extension engaged at one end of said body, a rotary valve mounted transversely in said body adapted to control the passage therethrough, a lever engaged with said valve whereby it may be operated, a float operable in said tank, an arm engaged with said float, said arm passing through the mentioned extension, and a pivotal connection between the upper end of said arm and said lever whereby said valve is operated according to the movement of said float.

4. In an automatic valve, the combination with a hollow body and means for securing said body in position, said body having a restricted through passage, a valve placed transversely in said passage adapted to rotate therein, squared extension at each end of said valve, a pair of oppositely disposed levers engaging with said extensions, means for holding said levers in spaced relation, said levers having elongated slots at their outer end, a pin movable in the slots, a bar engaged by said pin, means for guiding said bar formed with said body, and a float at the lower end of said bar whereby it is caused to raise or lower thereby operating said valve.

In testimony whereof I have affixed my signature.

FEDOR KONSTANTINOWICH REIBIN.